United States Patent
Schroeder

(10) Patent No.: US 9,950,475 B2
(45) Date of Patent: Apr. 24, 2018

(54) DEVICE AND METHODS FOR GENERATIVE MANUFACTURING

(71) Applicant: PREMIUM AEROTEC GMBH, Augsburg (DE)

(72) Inventor: Thorsten Schroeder, Jaderberg (DE)

(73) Assignee: PREMIUM AEROTEC GMBH, Augsburg (DE)

( * ) Notice: Subject to any disclaimer, the term of this patent is extended or adjusted under 35 U.S.C. 154(b) by 108 days.

(21) Appl. No.: 15/200,247

(22) Filed: Jul. 1, 2016

(65) Prior Publication Data
US 2017/0001372 A1 Jan. 5, 2017

(30) Foreign Application Priority Data
Jul. 3, 2015 (DE) .................. 10 2015 008 497

(51) Int. Cl.
| | |
|---|---|
| B29C 64/245 | (2017.01) |
| B29C 64/40 | (2017.01) |
| B22F 3/105 | (2006.01) |
| B29C 67/00 | (2017.01) |
| B33Y 30/00 | (2015.01) |
| B29C 43/14 | (2006.01) |
| B29C 64/153 | (2017.01) |

(52) U.S. Cl.
CPC ........ *B29C 67/0074* (2013.01); *B22F 3/1055* (2013.01); *B29C 43/146* (2013.01); *B29C 64/153* (2017.08); *B33Y 30/00* (2014.12); *B22F 2003/1056* (2013.01); *Y02P 10/295* (2015.11)

(58) Field of Classification Search
None
See application file for complete search history.

(56) References Cited

U.S. PATENT DOCUMENTS

| | | | |
|---|---|---|---|
| 2015/0246485 A1* | 9/2015 | Guenster | B22F 3/1055 264/511 |
| 2016/0082670 A1* | 3/2016 | Paroda | B29C 37/0003 425/375 |
| 2016/0288416 A1* | 10/2016 | Robles Flores | B29C 64/112 |

FOREIGN PATENT DOCUMENTS

| | | |
|---|---|---|
| WO | WO 2014/172496 | 9/2014 |
| WO | WO 2014/172496 | 10/2014 |

OTHER PUBLICATIONS

German Office Action for Application No. 10 2015 008 497 dated Apr. 21, 2016.

* cited by examiner

*Primary Examiner* — Mary Lynn F Theisen
(74) *Attorney, Agent, or Firm* — Jenkins, Wilson, Taylor & Hunt, P.A.

(57) ABSTRACT

A device for generative manufacturing of a component, in particular for layered generative manufacturing of a component which is printed on a base plate. The base plate forms a connecting surface for applying and compacting powder in order to manufacture the component, and includes a plurality of sheets, the sheets being formed and arranged next to one other such that the connecting surface of the base plate is formed by lateral surfaces of the sheets.

8 Claims, 4 Drawing Sheets

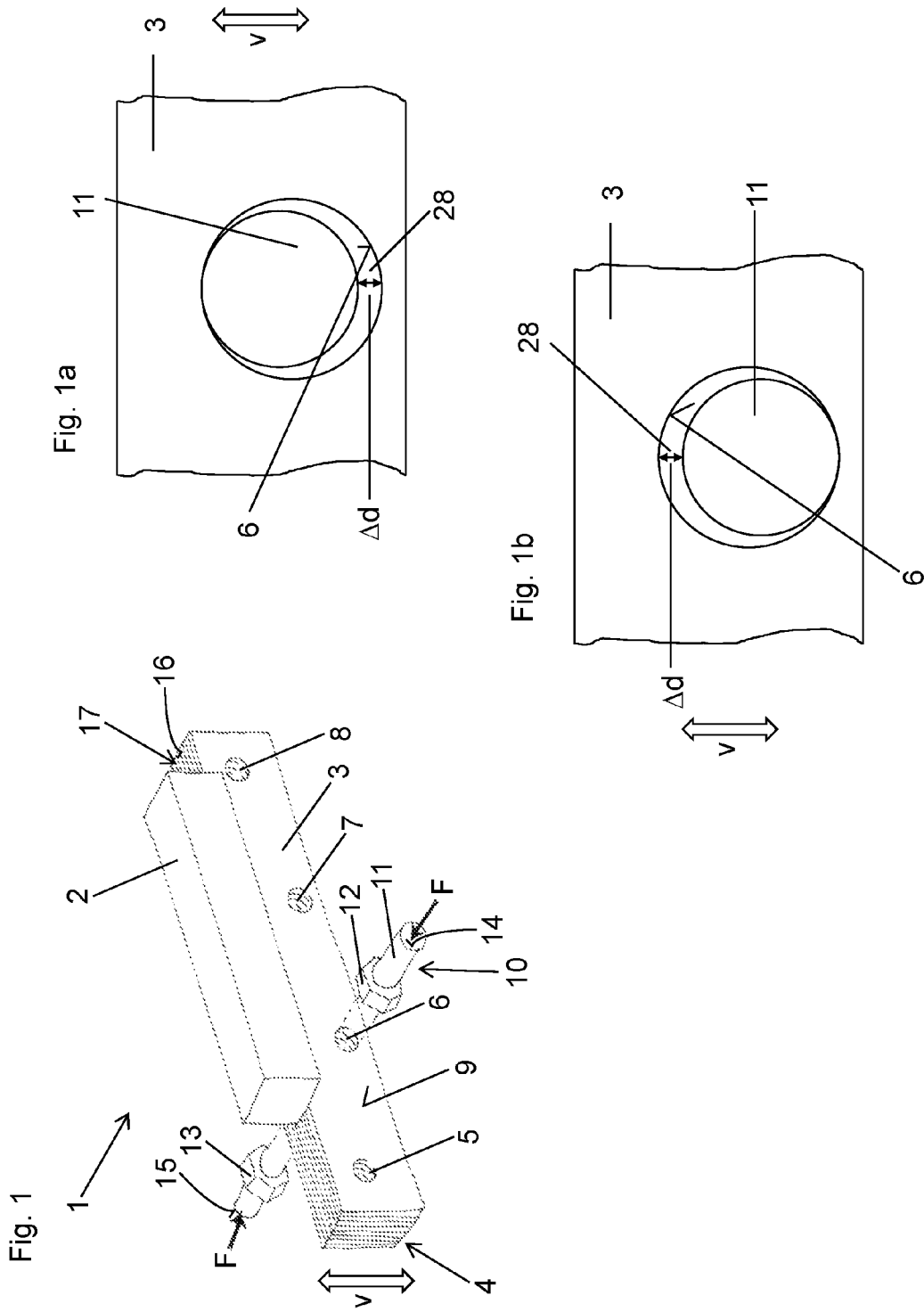

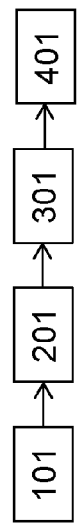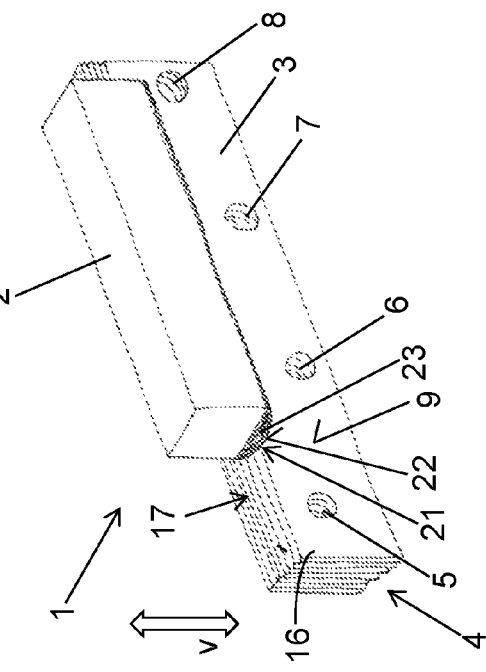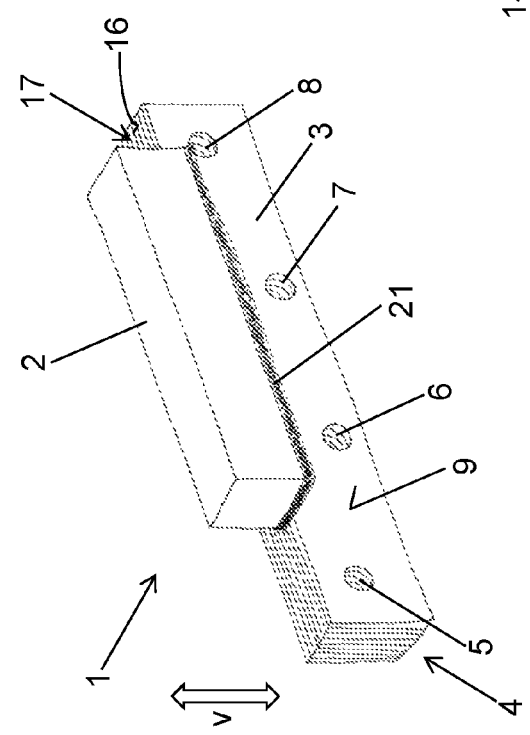

DEVICE AND METHODS FOR GENERATIVE MANUFACTURING

CROSS-REFERENCE TO RELATED APPLICATION

This application claims priority to DE 10 2015 008 497.6 filed Jul. 3, 2015, the entire disclosure of which is incorporated by reference herein.

TECHNICAL FIELD

The disclosure herein relates to devices and methods for the generative manufacture of components, in particular for the layered generative manufacture of components which are printed on a base plate.

BACKGROUND

In layered generative manufacture, powder can be successively applied under inert gas in thin layers to a base plate and the powder of the respective thin layer can be selectively compacted to thereby produce a three-dimensional compacted component.

Known devices and methods for generative manufacture provide a solid base plate, onto which the powder is successively applied in thin layers and compacted. After all the intended layers have been applied and compacted and the component has been produced thereby, the base plate must be either destroyed or treated, for example by a milling method, an erosion method or by a sawing method in order to detach the generated component from the base plate. A disadvantage here is that additional machines are required and the base plate may possibly not be reusable. Furthermore, on solid base plates, defects can occur in the joining region between component and base plate which can result in the material of the component and/or of the base plate tearing off or becoming detached.

Alternatively, it is known to apply a support structure between the component and the carrier plate. However, this support structure must be of a very solid formation, as otherwise the component can be torn off the carrier plate due to the resulting thermal distortion. Furthermore, due to the attachment of such a solid support structure, it is no longer possible to separate the component from the base plate manually.

SUMMARY

Therefore, one of the ideas of the present disclosure relates to a device and a method of the type mentioned at the outset which allow the component which has been produced to be detached more easily from the base plate and, in so doing, reduce the risk of damage to the component.

The device according to the disclosure herein for the generative manufacture of components comprises a base plate which forms a connecting surface for applying and compacting powder in order to manufacture the component. The base plate comprises a plurality of metal sheets, the metal sheets being formed and arranged next to one another such that the connecting surface of the base plate is formed by lateral surfaces of the metal sheets.

In other words, the concept of a simplified separation of the component is based on separation of the base plate or of the support surface thereof, the metal sheets forming a cohesive stack of sheets and thereby forming the base plate and the support surface thereof. The base plate is constructed modularly or in segments by the plurality of metal sheets, for example steel sheets, it being possible, for example, for the sheets to be formed identically, i.e. they have in particular the same surfaces and material thicknesses. In each case, one lateral surface of each sheet is arranged next to a lateral surface of an adjacent sheet, thereby forming the connecting surface. For example, the mentioned lateral surfaces can be arranged in one plane without mutual spacing so that a continuous and flat connecting surface of the base plate is formed. However, depending on the type of use and on the component to be manufactured, any other forms of connecting surfaces can also be formed by the sheets. Each sheet, viewed in isolation, forms a small sub-region of the support surface compared to the entire support surface, as a result of which a component which has been manufactured can be detached particularly easily from the sub-region of the support surface and thereby from the sheet. The smaller a sub-region of the support surface, respectively formed by the individual layers, the easier it is for a manufactured component to be detached from this sub-region. Therefore, the connecting surface for the component to be manufactured was formed from a stack of sheets.

During the manufacture of a component, the stack of sheets, i.e. all of the sheets, behaves analogously to a solid base plate, but affords the advantage that, after the printing process, the sheets can be manually and individually detached and removed, one after another, from the manufactured or generated component. Furthermore, after a component has been manufactured, the base plate does not have to be destroyed, but can be reused to manufacture further component. It is also possible to forgo a milling, erosion or sawing method and also an associated expense in terms of apparatus for detaching the component from the base plate. In addition, the finishing time for the manufactured component can be shortened, as a result of which the cycle time can be reduced. The possible multiple use of the base plate means that costs can also be reduced and the sheets can be easily implemented in existing systems. In this respect, the risk of tears in the connection between the component and the base plate is reduced and the process reliability is increased thereby.

An embodiment of the device according to the disclosure herein is configured to generate a defined tension force between the sheets, the tension force allowing individual sheets to yield during the application and compaction of the powder on the connecting surface. The yielding can be allowed in a direction which is identical to a direction in which a compacting pressure for compacting the powder for producing a component acts on the connecting surface. In other words, during the manufacture or generation of a part, the base plate is flexible, or the sheets forming the base plate are flexible.

The defined tension force holds the sheets together such that the lateral mutual spacing thereof does not change. However, the defined tension force is calculated such that the lateral surfaces of the respective sheets which form the connecting surface can be moved relative to one another. The connecting surface can thus react to locally occurring pressures during the manufacture of a component. The tension force can be used to monitor the force at which the sheets start to move. This embodiment makes it possible to further reduce the risk of damage to the component due to undesirable detachments of material of the component.

In this regard, it is provided for the device to have a screw connection which is configured to generate the defined tension force. The screw connection has a tolerance range in order to allow a movement of the sheets. The screw connection can have, for example, a rod which is inserted into the sheets through mutually aligning holes. A diameter of the holes can be slightly larger than the diameter of the rod, thereby establishing the tolerance range. The stack of sheets can be braced in a defined manner by a thread of the rod, and by two nuts and optionally washers which rest on the outer sheets. The sheets can be allowed to move in that they are braced by the screws such that a clearance is formed above the rod between rod and hole, the clearance being delimited by the diameter difference. In order to introduce a particularly uniformly distributed force into the sheets, a plurality of such screw connections can also be provided, more preferably at the same mutual spacing.

Furthermore, the device can have a hold-down which is configured to prevent a yielding of individual sheets while the powder is applied to and compacted on the connecting surface. This is particularly advantageous when movement of the sheets is not desired. This could be ensured by a correspondingly high tension force. Alternatively, or if the tension force is inadequate, the sheets can also be held mechanically on one plane in the constrained position by the mentioned hold-down, for example by clamps.

A method according to the disclosure herein for the generative manufacture of a component or components starts with the provision of a device, described above, for the generative manufacture of components. The device comprises in particular a base plate which forms a connecting surface for applying and compacting powder, the base plate comprising a plurality of sheets. The sheets are formed and arranged next to one another such that the connecting surface of the base plate is formed by lateral surfaces of the sheets. Thereafter, the component is produced by successively applying and compacting powder in thin layers on the connecting surface. Subsequently, the sheets are separated and detached individually or in groups from the component which has been produced. In this method, the sheets behave analogously to a solid component plate, but they afford the advantage that, after the printing process, the sheets can be manually removed individually or in groups one after another from the manufactured component. With regard to further advantages and advantageous embodiments of this method according to the disclosure herein, to avoid repetition, reference is made to the embodiments provided above in connection with the device according to the disclosure herein.

A further method according to the disclosure herein for the generative manufacture of a component or components also starts with the provision of a device, described above, for the generative manufacture of components. The device comprises in particular a base plate which forms a connecting surface for applying and compacting powder to manufacture the component. The base plate comprises a plurality of sheets, the sheets being formed and arranged next to one another such that the connecting surface of the base plate is formed by lateral surfaces of the sheets. Thereafter, a sacrificial layer is produced by applying and compacting powder on the connecting surface. The component is then produced by successively applying and compacting powder in thin layers on the sacrificial layer. The sheets are separated individually or in groups from the sacrificial layer.

This method is used particularly advantageously when a movement of the sheets is desired and a device is provided which is configured, for example by a screw connection, to generate a defined tension force between the sheets, the tension force allowing a yielding of individual sheets while the powder is applied to and compacted on the connecting surface. In this case, the sacrificial layer, which is generated under the component to be manufactured and above the connecting surface, can compensate for a deflection or movement of the sheets. The sacrificial layer can be produced in that, on the one hand, it is possible to manufacture thereon a component using powder and, on the other hand, only a very weak join with the sheets is produced. After the component has been manufactured, the sacrificial layer has to be removed therefrom. This method makes it possible to reduce the inherent tensions during the manufacture of the component. Likewise, the risk of manufactured components becoming accidentally detached from the base plate can be reduced, since some of the resulting forces or pressures are compensated by the flexible sheet stack.

The sacrificial layer can be advantageously produced in that it has a rounded support surface which adheres to the connecting surface. This embodiment contributes towards ensuring an adequately firm join between the sacrificial layer and the sheets, while on the other hand also allowing the sacrificial layer to be manually detached from the sheets.

A similar advantage can be provided when the sacrificial layer is produced such that it has a grid structure, a combination with an aforementioned rounded connecting surface being particularly preferred.

BRIEF DESCRIPTION OF THE DRAWINGS

In the following, embodiments of the disclosure herein will be described in more detail with reference to drawings, in which:

FIG. 1 is a perspective view of an embodiment of a device according to the disclosure herein having a screw connection, FIG. 1 *a, b* are side views of an enlarged part of the device according to

FIG. 1,

FIG. 3*a* shows the device according to FIG. 1 without a screw connection during the manufacture of a component according to a further embodiment of a method according to the disclosure herein, FIG. 3*b* shows a schematic flow chart of the method according to FIG. 3*a*, FIG. 4 shows the device according to FIG. 1 without a screw connection during the manufacture of a component according to a further embodiment of a method according to the disclosure herein.

In the drawings, the same or similar elements have been provided with the same reference numerals. The drawings in the figures are merely schematic and are not true to scale.

DETAILED DESCRIPTION

Figure 2A:
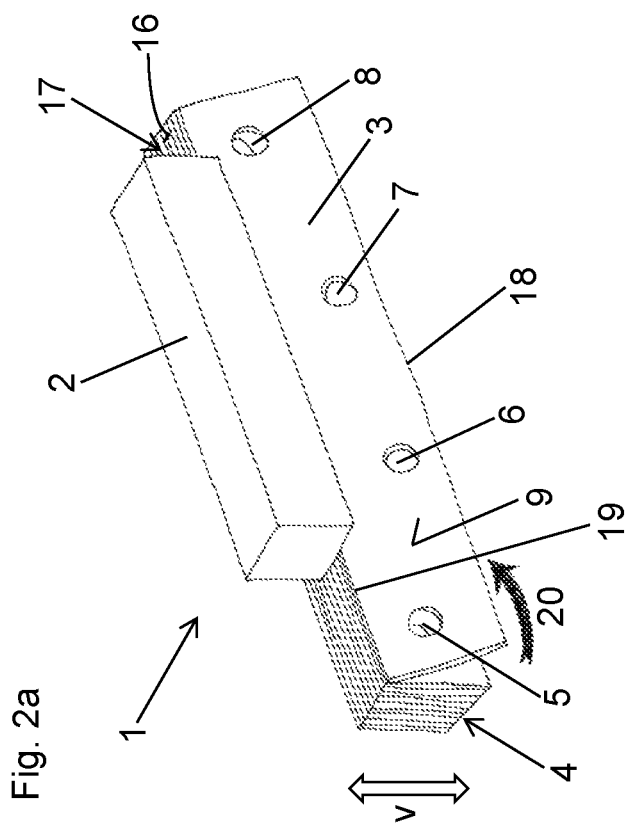
FIG. 2*a* shows the device according to FIG. 1 without a screw connection during the manufacture of a component according to an embodiment of a method according to the disclosure herein.

FIG. 1 shows a device 1 and a component 2 which has been produced by a layered generative manufacturing method. The device 1 comprises a total of eight identical sheets 3 which are arranged such that they are next to one another and rest against one another, and consist of or comprise the same material as the manufactured component 2. The sheets 3 together form a base plate 4 of the device 1, only one of the sheets 3 having been provided with a reference numeral for reasons of clarity. Each of the sheets 3 has a total of four straight holes 5 to 8 which are evenly distributed along the surface 9 of the respective sheet 3.

The sheets 3 can be held together and braced against one another by a screw connection 10. For this purpose, the screw connection 10 has a cylindrical rod 11 as well as two identical nuts 12 and 13. The rod 11 has an external thread (not shown) which fits the nuts 12 and 13 and can be pushed through mutually aligning holes 6 in the sheets 3.

As can be seen in FIG. 1a and 1b, the external diameter of the rod 11 is smaller than the internal diameter of the holes 6 in the sheets 3. A tolerance range of the screw connection 10 is produced thereby. The tolerance range allows a clearance 28 to be created between the rod 11 and the holes 6 of the size of a diameter difference Δd between the external diameter of the rod 11 and the internal diameter of the holes 6. The nuts 12 and 13 can be screwed onto the rod 11 over opposite end faces 14 and 15 of the rod 11 until they rest against mutually remote upper sides 9 of the outer sheets 3. By subsequently countering the two nuts 12, 13, a defined tension force F of the screw connection 10 can then be adjusted which acts on both sides on the surfaces 9 of the sheets 3 and thereby braces the sheets 3. Without a bracing action by the nuts 12 and 13, the sheets 3 together with their holes 6 can rest using gravity on an upper region of the rod 11 (FIG. 1a). Alternatively, before the bracing action, the rod 11 can be positioned in the holes 6 in the sheets 3 such that a lower region of the rod 11 comes into contact with the holes 6 in the sheets 3 (FIG. 1b) and a clearance 28 is created above the rod 11. According to the alternative of FIG. 1b, the sheets 3 can be moved downwards in a vertical direction v, more specifically by the diameter difference Δd.

The screw connection 10 which is shown in an exploded manner in FIG. 1 and which, according to FIG. 1, is provided in the second holes 6 from the left, can also be provided in the same way in the other holes 5, 7 and 8 in the sheets 3, but this is not shown for reasons of clarity.

The sheets 3 respectively comprise two mutually opposite surfaces 9 and four lateral surfaces, the lateral surfaces 16, shown above in FIG. 1, of the sheets 3 being arranged in a common plane and together forming a connecting surface 17 of the base plate 4. Successive layers of powder were applied to and compacted on the connecting surface 17, from which is produced the cuboidal component 2, shown in FIG. 1, which adheres to the connecting surface 17, the individual layers of the component 2 not being shown in FIG. 1.

The tension force F of the screw connection 10 is adjusted in the example shown in FIG. 1 such that yielding of individual sheets 3 under pressure on the connecting surface 17 during the manufacture of the component 2 could result in a movement of individual sheets 3 in a vertical direction v at corresponding places on the connecting surface 17

Figure 2B:
FIG. 2*b* shows a schematic flow chart of the method according to FIG. 2*a*.

FIG. 2a shows the device according to FIG. 1 without a screw connection 10, which device has been provided in a first method step 100 according to an embodiment of a method of the disclosure herein according to FIG. 2b. Thereafter, in a second method step 200, a component 2 was produced by successively applying and compacting powder in thin layers on the connecting surface 17 of the base plate 4, it no longer being possible to see the individual layers in FIG. 2. In a subsequent step 300, a lower edge 18 of the sheet 3, shown at the front in FIG. 2, was manually rotated forwards by approximately 40° about an upper edge 19 of the sheet 3, which is illustrated by arrow 20. As a result, the front sheet 3 was detached from the component 2, without the sheet 3 or the component 2 being damaged by undesired detachment of material. The remaining seven sheets 3 are then detached individually in the same way as the front sheet 3 (not shown in FIG. 2a), and so all the sheets 3 were detached from the component 2 without being damaged.

FIG. 3a shows the device according to FIG. 1 without a screw connection 10, which device has been provided in a first method step 101 according to an embodiment of a further method of the disclosure herein according to FIG. 3b. In a second step 201, a solid sacrificial layer 21 was produced by applying and compacting powder on the connecting surface 17. The sacrificial layer 21 forms a region under a component 2 to be manufactured and compensates for a deflection or a movement of the sheets 3 in a vertical direction v during the production of the component 2. In a following step 301, the component 2 was produced by successively applying and compacting powder in thin layers on the sacrificial layer 21, the individual layers not being shown in FIG. 3a. Thereafter, in a further method step 401, the sheets 3 are separated individually from the sacrificial layer 21. In principle the layers are separated as shown in FIG. 2a, but with the difference that the sheets 3 were not detached directly from the manufactured component 2, but from the sacrificial layer 21.

The embodiment according to FIG. 4 differs from that according to FIG. 3 in the production of the sacrificial layer 21 which has a rounded support surface 22 which adheres to the connecting surface 17 of the base plate 4 of the device 1 and, in cross section, has a grid-shaped structure 23.

Figure 5:
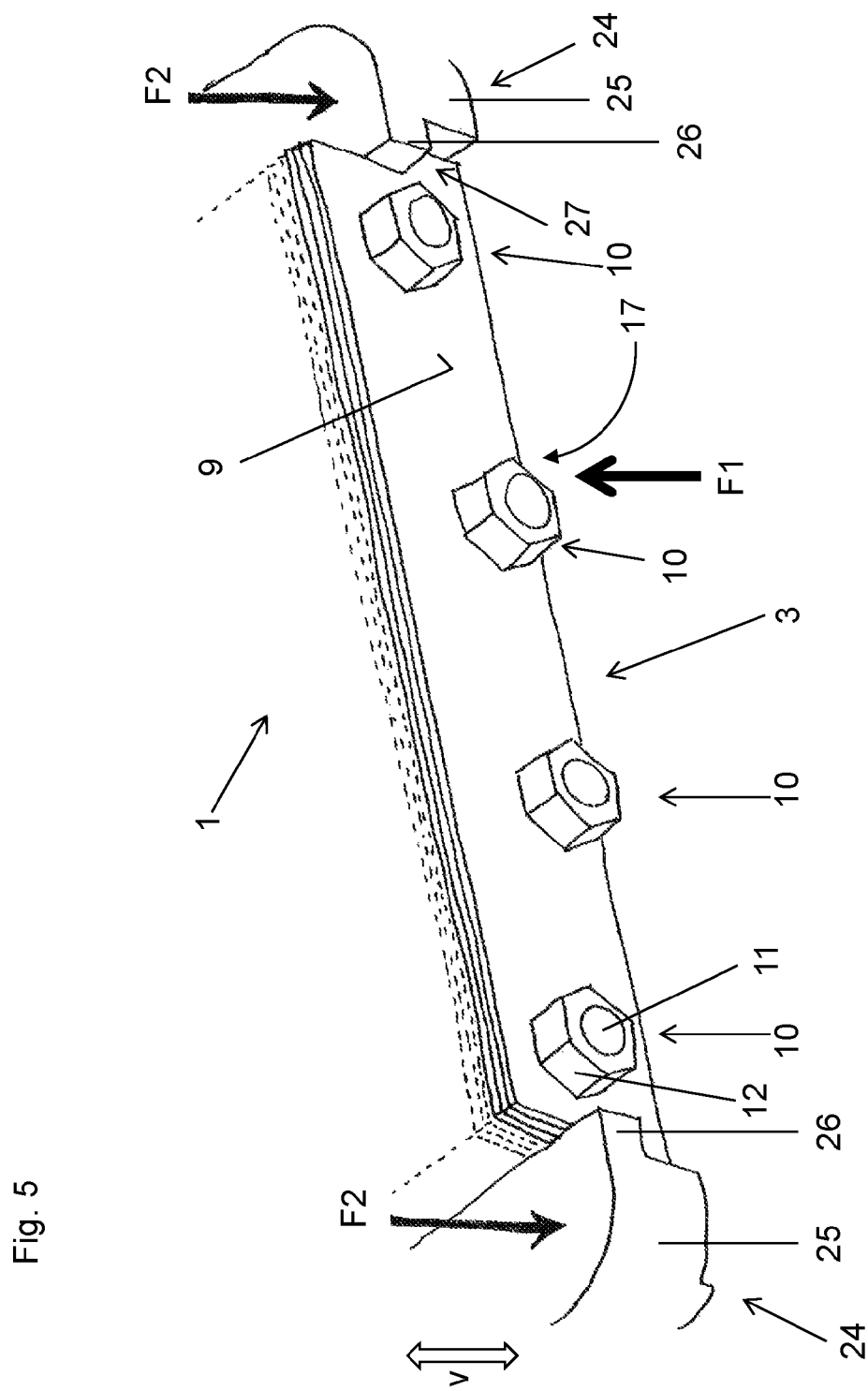
FIG. 5 is a perspective view of a further embodiment of a device according to the disclosure herein having four screw connections and a hold-down device.

The embodiment, shown in FIG. 5, of a device 1 according to the disclosure herein comprises four identical screw connections 10 which are in principle constructed identically to the screw connections 10 according to FIG. 1. Furthermore, the device 1 comprises a hold-down 24 which can comprise two clamps 25 which each have a shoulder region 26. The clamps 25 are arranged on two opposite lateral surfaces of the sheets 3, a respective shoulder 27 of the sheets 3 being supported on one of the shoulder regions 26 of the clamps 25. When a force F1 acts on the connecting surface 17, for example during the manufacture of a component, not shown in FIG. 5, on the connecting surface 17, the hold-down 24 generate corresponding counter forces F2, thereby preventing the sheets 3 from moving in a vertical direction v.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:
1. A device for generative manufacture of parts, the device comprising:
    a base plate which forms a connecting surface for applying and compacting powder in order to manufacture the component, the base plate comprising a plurality of sheets, the sheets being formed and arranged next to one another such that the connecting surface of the base plate is formed by lateral surfaces of the sheets.

2. The device of claim 1, wherein the device is configured to generate a defined tension force between the sheets, the tension force allowing individual sheets to yield while the powder is applied to and compacted on the connecting surface.

3. The device of claim 2, wherein the device has a screw connection which is configured to generate the defined tension force.

4. The device of claim 1, wherein the device comprises a hold-down configured to prevent individual sheets from yielding while the powder is applied to and compacted on the connecting surface.

5. A method for generative manufacture of a component, the method comprising:
providing a device for generative manufacture of parts, the device comprising a base plate which forms a connecting surface for applying and compacting powder in order to manufacture the component, wherein the base plate comprises a plurality of sheets, wherein the sheets are formed and arranged next to one another such that the connecting surface of the base plate is formed by lateral surfaces of the sheets;
producing the component by successively applying and compacting powder in thin layers on the connecting surface; and
separating the sheets individually or in groups from the produced component.

6. A method for generative manufacture of a component, the method comprising:
providing a device for generative manufacture of parts, comprising a base plate which forms a connecting surface for applying and compacting powder in order to manufacture the component, wherein the base plate comprises a plurality of sheets, wherein the sheets are formed and arranged next to one another such that the connecting surface of the base plate is formed by lateral surfaces of the sheets;
producing a sacrificial layer by applying and compacting powder on the connecting surface;
producing the component by successively applying and compacting powder in thin layers on the sacrificial layer; and
separating the sheets individually or in groups from the sacrificial layer.

7. The method of claim 6, wherein the sacrificial layer is produced such that the sacrificial layer has a rounded support surface which adheres to the connecting surface.

8. The method of claim 6, wherein the sacrificial layer is produced such that the sacrificial layer has a grid structure.

* * * * *